March 27, 1951 C. E. ADAMS ET AL 2,546,579
FLUID MOTOR CONTROL MECHANISM
Filed Aug. 13, 1946 2 Sheets-Sheet 1

INVENTORS
CECIL E. ADAMS
ELLIS H. BORN
BY
Herschel C. Omohundro
Attorney

March 27, 1951  C. E. ADAMS ET AL  2,546,579
FLUID MOTOR CONTROL MECHANISM
Filed Aug. 13, 1946  2 Sheets-Sheet 2

INVENTORS
CECIL E. ADAMS
ELLIS H. BORN
BY
Herschel C. Omohundro
Attorney

Patented Mar. 27, 1951

2,546,579

UNITED STATES PATENT OFFICE 2,546,579

FLUID MOTOR CONTROL MECHANISM

Cecil E. Adams and Ellis H. Born, Columbus, Ohio, assignors to The Denison Engineering Company, Columbus, Ohio Application August 13, 1946, Serial No. 690,184

8 Claims. (Cl. 121—38)

This invention relates generally to hydraulic mechanism and is more specifically directed to mechanism for controlling the operation of fluid motors.

One of the objects of the present invention is to provide a hydraulic circuit including a reversible fluid motor and control mechanism for governing the operation thereof, the mechanism functioning during operation of the motor in either direction.

Another object of the invention is to provide a hydraulic circuit having a speed control device provided with valve means operative when desired to shunt fluid flow around the speed control device whereby the fluid motor will receive the full pump volume to effect full speed operation thereof.

A further object of the invention is to provide a speed control device equipped with spool mechanism which is responsive to the pressure drop across an orifice disposed in one of the fluid lines forming a part of the circuit, the spool being affected in the same manner by the pressure drop when fluid is flowing in either direction through the orifice.

A still further object of the invention is to provide a speed control device for fluid motors having a casing in which a fluid control spool is mounted for movement, the spool being spring centered and being provided with a plurality of passages so arranged that the application of the fluid pressure at the high side of the pressure drop mentioned in the preceding paragraph to either end of the spool will cause movement thereof to dispose the passages therein in substantial registration with other passages formed in the body.

Another object of the invention is to provide a flow control device having relatively movable sleeve and spool members with cooperating grooves and passages, means being provided to vary the relative position of these elements to form a variable orifice, one of the elements being movable to so increase the size of the orifice that substantially unrestricted flow therethrough will be established.

Other objects and advantages will be apparent from the following description of one embodiment of the invention illustrated in detail on the accompanying drawings.

Figure 4:
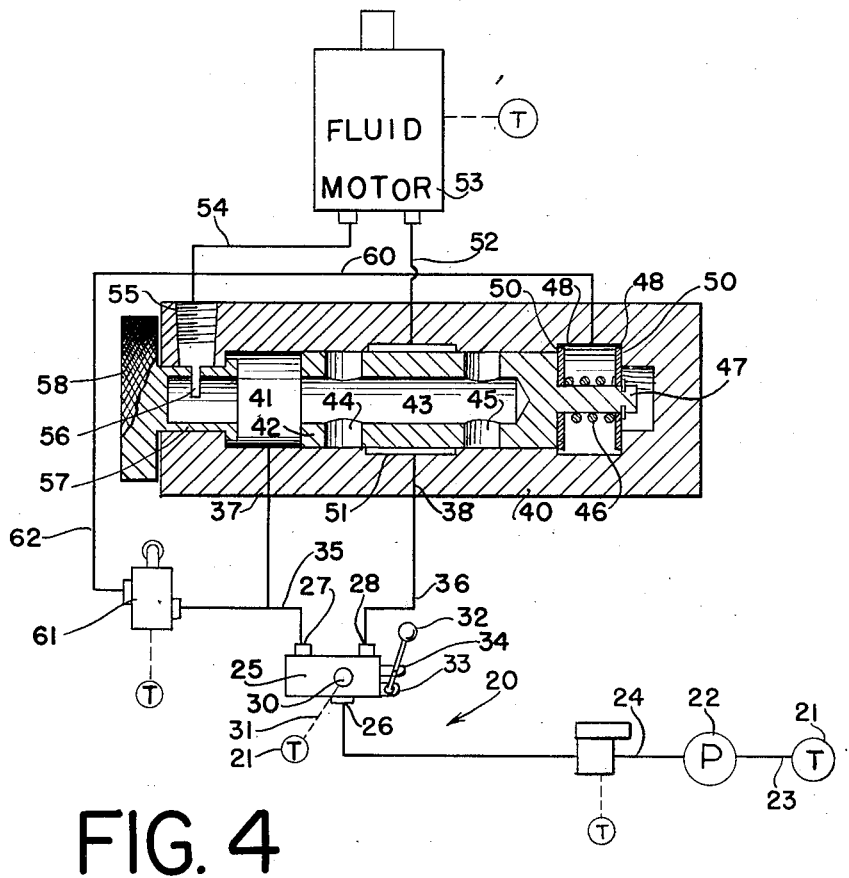
Fig. 4 is a diagrammatic view of the hydraulic circuit in which the fluid motor and flow control mechanism have been incorporated.

Referring more particularly to the drawings, numeral 20 designates the hydraulic circuit illustrated in Fig. 4. This circuit includes a fluid reservoir or tank 21, a power-operated pump 22 for drawing fluid from the tank 21 through a line 23 and directing the same through another fluid line 24 to a four-way valve 25. This valve may be of any suitable type depending upon the mechanism intended to be controlled thereby. For convenience in illustrating, a simple four-way valve has been shown, this valve having an inlet port 26, with which line 24 communicates, a pair of spaced work ports 27 and 28 and an outlet port 30 which is connected by a line 31, with the reservoir or tank 21. The valve 25 is also provided with an operating lever 32 mounted as at 33 for pivotal movement to impart longitudinal travel to a control spool 34. Through the operation of the handle 32 either of the ports 27 or 28 may be connected with the inlet 26 and the other with the outlet 30. Fluid lines 35 and 36 are connected with the work ports 27 and 28 respectively, these lines extending to spaced ports 37 and 38 in the body 40 of the speed control mechanism.

In the diagrammatic illustration shown in Fig. 4, the body 40 is provided with a central chamber 41 with which the ports 37 and 38 communicate at spaced points. This chamber 41 slidably receives a flow control spool 42 having a longitudinal socket 43 and transversely extending passages 44 and 45 spaced longitudinally of the spool. Under normal conditions, or when the flow control is inoperative, the spool 42 will be held in the position shown by a coil spring 46 which surrounds the reduced end 47 of the spool between a pair of washers 48 also disposed on the reduced end 47. These washers are arranged to engage shoulders 50 formed in the chamber 41, the shoulders serving as spring abutments. Due to the arrangement of spring and washers on the spool 42, the latter will be yieldably retained against longitudinal movement in either direction. When the spool is positioned as shown in Fig. 4, the transverse passages 44 and 45 will be in a non-registering relation with an annular groove 51 formed in the body 40 in communication with the port 38, this groove 51 being connected by a line 52 with one port of the fluid motor 53, the other port of this motor being connected by a line 54 with a port 55, also formed in the body 40 of the flow control device. The port 55 communicates with the chamber 41, the degree of communication being controlled by a variable orifice 56 formed in a sleeve 57 which is disposed for adjustment in the body 40. This sleeve extends to the exterior of the body 40 and is provided with a knob 58 on its outer end to effect the adjustment of the orifice.

In the operation of the mechanism thus far described, fluid from the pump may be caused to flow through either line 35 or 36 to effect the operation of the fluid motor 53. If line 36 is connected with the supply, fluid will flow directly to the fluid motor without obstruction. This fluid will be discharged from the motor through line 54 and will flow through the orifice 56, the interior of the chamber 41 and through line 35, valve 25 and line 31 to tank 21. If the knob 58 has been previously set to cause orifice 56 to resist fluid flow from port 55 to chamber 41, a pressure drop on opposite sides of this orifice will be created. This pressure drop is utilized to control the rate of operation of the fluid motor 53 by connecting a line 60 with line 54 and chamber 41 at one end of the spool 42.

In Fig. 4 the line 60 extends to the chamber 41 at the right end of the spool 42. Since the fluid pressure in line 54 will be greater than the fluid pressure in chamber 41, spool 42 will move toward the left in opposition to the force of spring 46 to cause passages 45 to communicate with groove 51. When such communication is established, a portion of the fluid flowing through line 36 to groove 51 will flow through passages 45 and socket 43 to the interior of the chamber 41, from which this fluid may flow through line 35, valve 25 and line 31 to the tank 21. Due to the by-passing of fluid in this manner, the rate of operation of the fluid motor will be reduced, the degree of reduction being determined by the setting of the orifice 56.

If desired, full pump volume may be supplied to the fluid motor to effect full speed operation, without disturbing the setting of the orifice 56, through the actuation of an "on and off" valve 61 which is disposed in a by-pass line 62 connecting lines 35 and 54. This by-pass line extends around the orifice 56 and when the valve 61 is open, fluid may flow from the line 54 directly to line 35 without flowing through the orifice 56; the pressure differential caused by the orifice 56 will then be dissipated permitting spring 46 to return spool 42 to its centered position wherein full pump volume will be directed to the fluid motor 53.

It will be noted that when lines 36 and 52 function as inlet lines the orifice 56 creates pressure differential in the outlet line for the fluid motor 53, the pressure differential being employed to move spool 42 in one direction to effect a by-passing of a portion of the fluid supply and a reduction in speed of operation of the motor. If the valve control lever 32 is actuated to reverse the direction of operation of the motor 53, line 35 will then be employed as the inlet line for the motor and the orifice 56 will cause a pressure drop in the supply line. At this time the higher pressure will exist in chamber 41 and will be applied directly to the left end of the flow control spool 42. Since the chamber 41 at the right end of this spool is connected by line 60 with line 54 in which the lower pressure exists, spool 42 will move toward the right to cause communication between passages 44 and groove 51. Fluid from the supply will then be by-passed from the chamber 41 through socket 43 and passages 44 to chamber 41 from which it will flow to tank 21 through line 36, valve 25, and line 31. It will thus be seen that the flow control mechanism is operative to govern the speed of the fluid motor during rotation in either direction in the same manner since the same orifice functions to produce the pressure differential and the flow control spool has equal end areas exposed to the different pressures. The fluid motor may be reversed as many times as desirable without varying the rate of rotation in either direction.

Through the provision of the valve 61 and by-pass line 62 the flow control mechanism may be cut out and the fluid motor caused to operate at full speed, when desired, without changing the setting of the orifice or the controlled speed of the motor, thus by closing valve 61 the same controlled speed may be resumed at any time.

Figure 1:
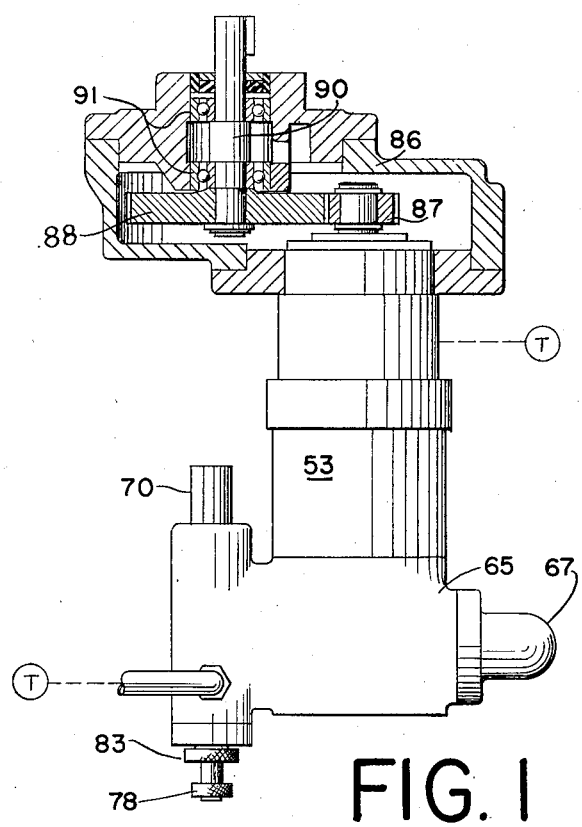
Fig. 1 is a side elevational view of a fluid motor provided with a gear reduction head on one end and a speed control mechanism, formed in accordance with the present invention, at the opposite end.
Figure 2:
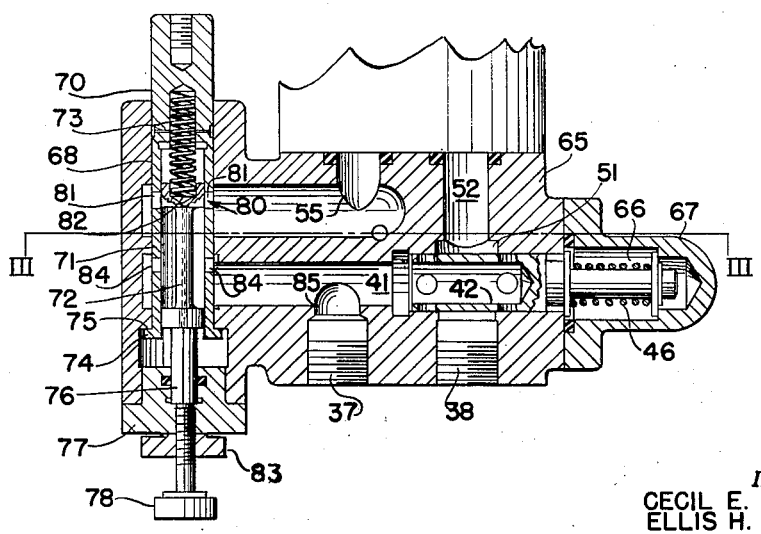
Fig. 2 is a detail vertical sectional view taken through the control mechanism and the lower portion of the hydraulic motor.
Figure 3:
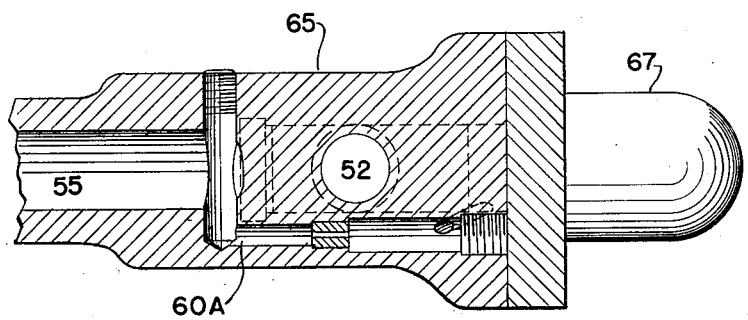
Fig. 3 is a detail horizontal sectional view taken through the control mechanism on the plane indicated by the line III—III of Fig. 2.

Figs. 1, 2, and 3 illustrate one embodiment of the flow control mechanism in which the variable orifice and the "on and off" valve have been combined, these elements being disposed in the same casing as the flow control spool. This casing designated by numeral 65, includes the ports 37 and 38, chamber 41, groove 51 and ports 52 and 55. Spool 42 is disposed for movement in chamber 41, spring 46 being connected with the spool and located in chamber extension 66 formed in a cap 67 applied to the casing 65. At one end the casing 65 is provided with a vertical bore 68 for the slidable reception of a plunger 70. This plunger has a socket 71 formed in the inner end and a spool 72 is disposed for longitudinal sliding movement in the socket 71. Spool 72 is urged in a downward direction by a coil spring 73 disposed between the inner end of the spool and the inner end of the socket 71. This arrangement of the spring urges the plunger 70 in an outward direction, which movement is limited by the engagement of a flange 74 formed on the plunger, with a shoulder 75 provided adjacent the lower end of the bore 68. Since the movement of the plunger is limited, the tendency of the spring 73 to expand will urge the spool 72 downward into engagement with the inner end of an adjusting screw 76, the latter being threadedly carried by a plug 77 employed to close the open lower end of the bore 68. The adjusting screw 76 carries a knob 78 which corresponds to the knurled knob 58 in Fig. 4 and is employed to effect the adjustment of the orifice in setting the speed of operation of the motor 53 which is secured to the upper surface of the casing 65.

In the present illustration of the flow control mechanism the orifice 80, which corresponds to the orifice 56 in the control circuit shown in Fig. 4, comprises openings 81 formed in the plunger 70 with which head 82 on spool 72 cooperates. By adjusting screw 76 inwardly, head 82 will be moved into the socket 71 to expose a greater portion of the ports 81 and increase the effective size of the orifice 80. When the size of the orifice is increased, less fluid will be by-passed and the speed of operation of the motor will be increased.

The effective size of the orifice may be reduced by threading the adjusting screw outwardly. The position of this adjusting screw may be maintained through the operation of lock nut 83.

It will be seen from Fig. 2 that the effect of the orifice may be temporarily eliminated by depressing the plunger 70 a distance sufficient to permit full flow through the ports 81 to the socket 71 and through additional ports 84 to passage 85 which communicates with port 37.

From Fig. 3 it will be apparent that casing 65 is provided with a passage 60A which corresponds in function to line 60 in the diagram of Fig. 4 by connecting port 55 with the end of chamber 41 at the right end of spool 42.

As shown in Fig. 1, the fluid motor 53 has a gear housing 86 secured to the end opposite that occupied by the flow control mechanism. This housing contains a pinion 87 which is secured to the operating shaft of the fluid motor 53, and a gear 88 disposed in meshing engagement with the pinion, the gear being secured to the inner end of a stub shaft 90 journalled in bearings 91 in the casing. It should be obvious that rotation of the motor will impart similar movement to the stub shaft 90 and that, the gear and pinion may be transposed when it is desired to operate the stub shaft at a higher speed than the rate of operation of the motor shaft.

While the form of embodiment of the present invention as herein disclosed constitutes a preferred form, it is to be understood that other forms might be adopted, all coming within the scope of the claims which follow.

We claim:

1. In a hydraulic system, a source of fluid pressure; a reversible fluid motor; a reversing valve having inlet, work, and exhaust ports; fluid conducting means connecting said inlet port with said fluid pressure source and said work ports with said fluid motor, said reversing valve being operative to alternately connect said work ports with said inlet and exhaust ports; orifice means disposed in a fluid conductor between said reversing valve and said fluid motor, said orifice means creating pressure differentials in said conductor when fluid flows in either direction therethrough; valve means for controlling communication between the fluid conductors connected with said work ports; and passage means for applying the pressure differentials to said valve means to effect controlled communication between the fluid conductors irrespective of the direction of fluid flow through said orifice means.

2. In a hydraulic system, a source of fluid pressure; a reversible fluid motor; a reversing valve having inlet, work and exhaust ports; fluid conducting means connecting said inlet port with said fluid pressure source and said work ports with said fluid motor, said reversing valve being operative to alternately connect said work ports with said inlet and exhaust ports; orifice means disposed in a fluid conductor between said reversing valve and said fluid motor, said orifice means creating pressure differentials in said conductor when fluid flows in either direction therethrough; a flow control valve normally disposed to prevent communication between the fluid conductors connected with said work ports, said valve being movable in either of two directions to establish controlled communication between said conductors; and means for applying the fluid pressures on opposite sides of said orifice means to opposed portions of said flow control valve.

3. In a hydraulic system, a source of fluid pressure; a reversible fluid motor; a reversing valve having inlet, work and exhaust ports; fluid conducting means connecting said inlet port with said fluid pressure source and said work ports with said fluid motor, said reversing valve being operative to alternately connect said work ports with said inlet and exhaust ports; orifice means disposed in a fluid conductor between said reversing valve and said fluid motor, said orifice means creating pressure differentials in said conductor when fluid flows in either direction therethrough; a flow control valve normally disposed to prevent communication between the fluid conductors connected with said work ports, said valve being movable in either of two directions to establish controlled communication between said conductors; means for applying the fluid pressures on opposite sides of said orifice means to opposed portions of said flow control valve; and a valved by-pass conductor connected with the fluid conductor on opposite sides of said orifice means.

4. In a hydraulic system, a source of fluid pressure; a reversible fluid motor; a reversing valve having inlet, work and exhaust ports; fluid conducting means connecting said inlet port with said fluid pressure source and said work ports with said fluid motor, said reversing valve being operative to alternately connect said work ports with said inlet and exhaust ports; orifice means disposed in a fluid conductor between said reversing valve and said fluid motor, said orifice means creating pressure differentials in said conductor when fluid flows in either direction therethrough; a body having a chamber connected at opposite ends with the fluid conductor on opposite sides of said orifice means; and a spool member movable in toward either end of said chamber in response to pressure differentials at opposite ends thereof, to establish controlled communication between the fluid conductors connected with said work ports.

5. In a hydraulic system, a reversible fluid motor; a pair of fluid lines leading to said motor; speed control means connected with said fluid lines, said means having an orifice in one of said fluid lines; a passage between said lines; and a valve element responsive to a pressure drop across said orifice upon fluid flow in either direction through said orifice to establish communication between said lines through said passage.

6. In a hydraulic system, a reversible fluid motor; a pair of fluid lines leading to said motor; flow control means connected with said fluid lines, said flow control means having an orifice in one of said fluid lines; a passage between said fluid lines; a valve element normally yieldably held in a position in said passage to prevent fluid flow therethrough, said valve element being movable to either side of said position to establish controlled communication between said fluid lines; and additional passage means for applying the fluid pressures at opposite sides of said orifice to opposed portions of said valve element.

7. In a hydraulic system, a reversible fluid motor; a pair of fluid lines leading to said motor; flow control means connected with said fluid lines, said flow control means having an orifice in one of said fluid lines; a passage between said fluid lines, said passage having a chamber; a valve element disposed for longitudinal movement in said chamber; spring means normally centering said valve element in said chamber to prevent fluid flow through said passage; and additional passage means for applying the fluid pressures at opposite sides of said orifice to opposed portions of said valve element, the latter being movable in response to the greater pressure irrespective of the direction of fluid flow through said orifice to establish controlled fluid flow through said passage.

8. In a hydraulic system, a reversible fluid motor; a pair of fluid lines leading to said motor; flow control means connected with said fluid lines, said flow control means having an orifice in one of said fluid lines; a passage between said fluid lines, said passage having a chamber with spaced shoulders; a valve spool with spaced ports disposed for longitudinal movement in said chamber; spring means normally positioning said valve spool with said ports on opposite sides of said shoulders to prevent fluid flow through said passage; and additional passage means for applying the fluid pressures at opposite sides of said orifice to opposed portions of said valve element, the latter being movable in response to the greater pressure irrespective of the direction of fluid flow through said orifice to position certain of said ports between said shoulders to establish controlled fluid flow through said passage.

CECIL E. ADAMS.
ELLIS H. BORN.

REFERENCES CITED

The following references are of record in the file of this patent:

UNITED STATES PATENTS

| Number | Name | Date |
| --- | --- | --- |
| 1,467,522 | Amsler | Sept. 11, 1923 |
| 1,905,132 | Bishop | Apr. 25, 1933 |
| 1,923,595 | Temple | Aug. 22, 1933 |
| 1,972,462 | Schafer | Sept. 4, 1934 |
| 2,001,988 | Temple | May 21, 1935 |
| 2,028,766 | Ernst | Jan. 28, 1936 |
| 2,272,684 | Vickers | Feb. 10, 1942 |

FOREIGN PATENTS

| Number | Country | Date |
| --- | --- | --- |
| 775,261 | France | Oct. 8, 1934 |